United States Patent
Walter, III et al.

(10) Patent No.: US 10,185,299 B2
(45) Date of Patent: Jan. 22, 2019

(54) EDGE TREATMENT PROCESS

(71) Applicant: Ametek Precitech, Inc., Keene, NH (US)

(72) Inventors: Mark McNinch Walter, III, Keene, NH (US); Edward Everett Freyenhagen, Jr., Meredith, NH (US); Jeffrey William Roblee, Keene, NH (US)

(73) Assignee: Ametek Precitech, Inc., Keene, NH (US)

( * ) Notice: Subject to any disclaimer, the term of this patent is extended or adjusted under 35 U.S.C. 154(b) by 225 days.

(21) Appl. No.: 15/124,692

(22) PCT Filed: Mar. 11, 2015

(86) PCT No.: PCT/US2015/019815
§ 371 (c)(1),
(2) Date: Sep. 9, 2016

(87) PCT Pub. No.: WO2015/138529
PCT Pub. Date: Sep. 17, 2015

(65) Prior Publication Data
US 2017/0082999 A1    Mar. 23, 2017

Related U.S. Application Data

(60) Provisional application No. 61/951,032, filed on Mar. 11, 2014.

(51) Int. Cl.
*G05B 19/27* (2006.01)
*G05B 19/401* (2006.01)

(52) U.S. Cl.
CPC .......... *G05B 19/27* (2013.01); *G05B 19/401* (2013.01); *G05B 2219/37339* (2013.01); *G05B 2219/37607* (2013.01); *G05B 2219/45074* (2013.01)

(58) Field of Classification Search
None
See application file for complete search history.

(56) References Cited

U.S. PATENT DOCUMENTS

| | | |
|---|---|---|
| 4,693,761 A | 9/1987 | Bohm et al. |
| 5,088,337 A | 2/1992 | Bennett |

(Continued)

FOREIGN PATENT DOCUMENTS

| | | |
|---|---|---|
| EP | 0297491 A1 | 1/1989 |
| GB | 902421 A | 8/1962 |
| WO | 9500299 A1 | 1/1995 |

OTHER PUBLICATIONS

International Search Report PCT/US2015/019815, dated Jun. 19, 2015 (2 pages).

*Primary Examiner* — Tuan C Dao
(74) *Attorney, Agent, or Firm* — Carmody Torrance Sandak & Hennessey LLP

(57) ABSTRACT

A method and apparatus for treating a circumferential edge of a part are described. The method includes the steps of (1) mapping the circumferential edge of the part with a measuring device, either directly or differentially from a known shape profile; and (2) using the measured data to more accurately follow the circumferential edge of the part during subsequent treatment processing steps, thereby improving the accuracy of the treatment process and compared with a non-mapped treatment process.

16 Claims, 6 Drawing Sheets

(56) References Cited

U.S. PATENT DOCUMENTS

| | | | |
|---|---|---|---|
| 5,297,055 A | 3/1994 | Johnstone | |
| 5,598,760 A | 2/1997 | Sucic et al. | |
| 6,327,788 B1 | 12/2001 | Seddon et al. | |
| 6,634,114 B2 | 10/2003 | Bidwell | |
| 7,848,843 B2 | 12/2010 | Shibata | |
| 8,366,512 B2 | 2/2013 | Takeichi | |
| 9,971,339 B2 * | 5/2018 | Maloney | B25J 9/1684 |
| 2002/0168920 A1 | 11/2002 | Wallendorf et al. | |
| 2004/0003689 A1 * | 1/2004 | Bryan | B24B 11/00 82/1.11 |
| 2004/0223053 A1 * | 11/2004 | Gladnick | G01N 21/8806 348/79 |
| 2009/0030648 A1 | 1/2009 | Hunter et al. | |
| 2010/0004777 A1 * | 1/2010 | Song | B23Q 1/5406 700/177 |
| 2010/0079769 A1 | 4/2010 | Chen et al. | |
| 2010/0299104 A1 | 11/2010 | Tamai et al. | |
| 2011/0190922 A1 * | 8/2011 | Walker | B24B 13/06 700/118 |
| 2012/0156362 A1 * | 6/2012 | Sadovoy | B05B 12/084 427/9 |
| 2012/0246953 A1 | 10/2012 | Engel | |
| 2013/0155413 A1 | 6/2013 | Liesener et al. | |
| 2014/0088746 A1 * | 3/2014 | Maloney | B25J 9/1684 700/97 |
| 2016/0187867 A1 * | 6/2016 | Hasty | G05B 19/401 700/192 |

* cited by examiner

EDGE TREATMENT PROCESS

FIELD OF THE INVENTION

The present invention relates generally to a method of precisely measuring and treating a circumferential edge of a part.

BACKGROUND OF THE INVENTION

It is often desirable in the manufacturing of various parts to subject the circumferential edges of the part to various edge treatment processes in order to finish or coat the outer edges thereof. These edge treatment processes include, but are not limited to priming, painting, coating, pre-coating, machining, grinding, sanding, polishing, thermal edge finishing, among others. These parts may include, for example, various rigid or semi-rigid materials such as ceramics, glass, laminates, veneers, composite materials, thermoplastic and/or thermosetting polymers, photosensitive materials or photocurable materials, wood, metal, metal alloys, and combinations of one or more of these materials, among others.

While the parts made from these materials may have a predetermined general shape and aspect ratio, the dimensions of the edges themselves may not be identical, making it difficult to quickly and accurately treat or finish circumferential edges of multiple parts without error. This is especially true in situations where the part may be a substantially planar sheet, veneer, ply, layer or other similar surface and in which the parts may have rounded edges that are not identical or may have cutouts or indentations or protrusions in one or more edges or sections therein and it is desirable to treat substantially the entire circumferential edge of the part rapidly and precisely. In other words, the tolerance of the part itself may be much greater than the edge treatment process can permit. By "circumferential edge" what is meant is the boundary edge or perimeter of the surface of the part.

Thus, it would be desirable to provide an improved process that would allow for precise measuring of the actual dimensions of the circumferential edge of a part having a predetermined general shape and aspect ratio and using this measured data to more accurately treat and/or process the circumferential edge of the surface of the part. In addition, it would also be desirable to provide an improved process for edge treating the circumferential edges of similarly sized and shaped parts where adjustments to a tool path can be made in a measuring step quickly and accurately prior to the treatment step. It would also be desirable to process a part with unknown edge shape by measuring the edge and then treating the measured edge. Finally, it would be desirable to provide an improved process in which the measuring, treating and/or processing steps may be executed on the same process machinery.

SUMMARY OF THE INVENTION

It is an object of the present invention to provide a method of accurately and precisely measuring and mapping a circumferential edge of a part.

It is another object of the present invention to provide a high speed precision edge finishing treatment of a measured circumferential edge of the part.

To that end, in one embodiment, the present invention relates generally to a method of treating a circumferential edge of a part having a predetermined general shape and aspect ratio, the method comprising the steps of:

a) generating a predicted tool path of the circumferential edge of the part based on the predetermined general shape and aspect ratio of the part;
b) mapping the circumferential edge of the part with a measuring device to measure a deviation between the predicted tool path and an actual part profile using the measuring device over at least substantially the entire circumferential edge of the part;
c) combining the predicted tool path with the measured deviation to determine a computed tool path; and
d) following the circumferential edge of the part with a treating device using the computed tool path, wherein the computed tool path represents the sum of the predicted tool path and the measured deviation, wherein the circumferential edge of the part is measured and treated; and wherein the computed tool path follows the circumferential edge of the part precisely to improve the accuracy of the edge treatment process.

In another embodiment, the present invention also relates generally to a method of treating a circumferential edge of a part having an unknown shape and dimensions, the method comprising the steps of:

a) mapping at least substantially the entire circumferential edge of the part with a measuring device to measure the part profile and create a computed tool path for the actual part profile; and
b) following the circumferential edge of the part with a treating device using the computed tool path, wherein the circumferential edge of the part is measured and treated; and wherein the computed tool path follows the circumferential edge of the part precisely to improve the accuracy of the edge treatment process.

In another embodiment, the present invention relates generally to a method of treating a series of circumferential edges of parts having similar shapes and dimensions, comprising the steps of:

a) obtaining a previous tool path of a circumferential edge of a part, wherein the previous tool path is one used in treating a previous work piece having a similar shape and dimensions;
b) mapping the circumferential edge of the part with a measuring device to measure a deviation between the previous tool path and an actual part profile using the measuring device over at least substantially the entire circumferential edge of the part;
c) combining the previous tool path with the measured deviation to determine a computed tool path; and
d) following the circumferential edge of the part with a treating device using the computed tool path, wherein the computed tool path represents the sum of the previous tool path and the measured deviation, wherein the circumferential edge of the part is measured and treated; and wherein the computed tool path follows the circumferential edge of the part precisely to improve the accuracy of the edge treatment process.

In another embodiment, the present invention also relates generally to an apparatus for measuring and treating a circumferential edge of a part, the apparatus comprising:

a) a measuring device for mapping and measuring the circumferential edge of the part, wherein the measuring device is capable of measuring a deviation between a predicted tool path and an actual surface profile over at least substantially the entire circumferential edge of the part;

b) a treating device for processing the circumferential edge of the part after the circumferential edge of the part has been mapped and measured;

c) machine elements capable of securing the part and moving the circumferential edge of the part relative to the measuring device or the treating device;

d) a motion controller for monitoring and controlling the machine elements, wherein the motion control electronics store information related to the predicted tool path of the part and are capable of calculating the actual surface profile of at least substantially the entire circumferential edge of the part, and wherein the motion control electronics command the machine elements to move the circumferential edge of the part relative to the measuring device or the treating device to measure and/or treat the circumferential edge of the part, and e) an operator interface computer operatively connected to the motion controller, wherein the operator interface computer provides operator control over the machine elements.

BRIEF DESCRIPTION OF THE FIGURES

For a fuller understanding of the invention, reference is had to the following description taken in connection with the accompanying figures, in which.

Also, while not all elements may be labeled in each figure, all elements with the same reference number indicate similar or identical parts.

DETAILED DESCRIPTION OF THE PREFERRED EMBODIMENTS

Figure 1:
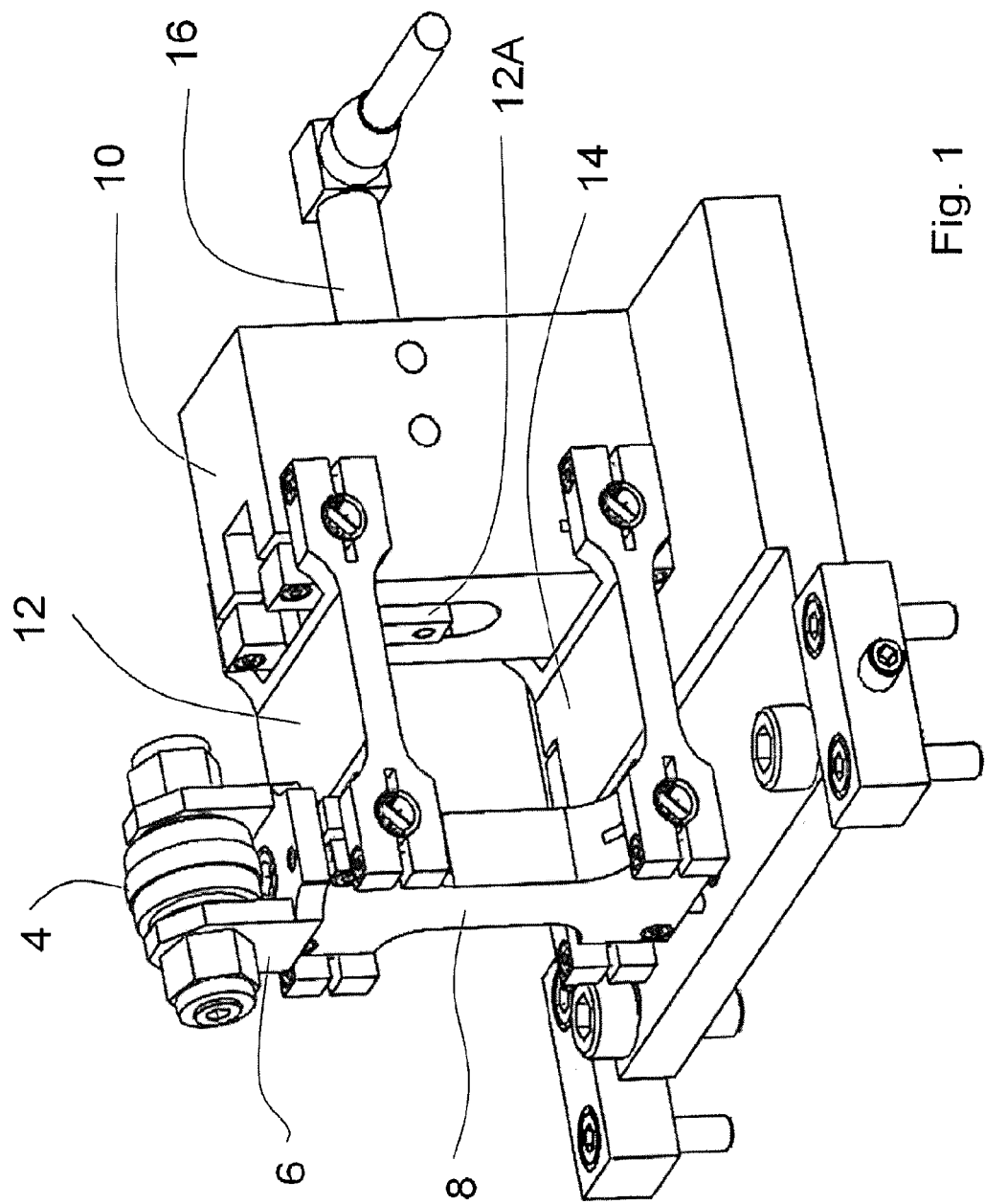
FIG. 1 depicts an apparatus for measuring a circumferential edge of a surface in accordance with one embodiment of the present invention.

As described herein, the present invention relates generally to a method of precisely mapping and measuring a circumferential edge of a part prior to treating the circumferential edge of the part. The present invention improves processing accuracy by mapping the edge shape form and using the mapped data to improve the accuracy of a subsequent edge treatment process.

In one embodiment, the present invention relates generally to a method of treating a circumferential edge of a part having a predetermined general shape and aspect ratio, the method comprising the steps of:

a) generating a predicted tool path of the circumferential edge of the part based on the predetermined general shape and aspect ratio of the part;

b) mapping the circumferential edge of the part with a measuring device to measure a deviation between the predicted tool path and an actual part profile using the measuring device over at least substantially the entire circumferential edge of the part;

c) combining the predicted tool path with the measured deviation to determine a computed tool path; and d) following the circumferential edge of the part with a treating device using the computed tool path, wherein the computed tool path represents the sum of the predicted tool path and the measured deviation, wherein the circumferential edge of the part is measured and treated; and wherein the computed tool path follows the circumferential edge of the part precisely to improve the accuracy of the edge treatment process.

In another embodiment, the present invention also relates generally to a method of treating a circumferential edge of a part having an unknown shape and dimensions, the method comprising the steps of:

a) mapping at least substantially the entire circumferential edge of the part with a measuring device to measure a part profile and create a computed tool path; and b) following the circumferential edge of the part with a treating device using the computed tool path, wherein the circumferential edge of the part is measured and treated; and wherein the computed tool path follows the circumferential edge of the part precisely to improve the accuracy of the edge treatment process.

In still another embodiment, the present invention relates generally to a method of treating a series of circumferential edges of parts having similar shapes and dimensions, comprising the steps of:

a) obtaining a previous tool path of a circumferential edge of a part, wherein the previous tool path is one used in treating a previous work piece having a similar shape and dimensions;

b) mapping the circumferential edge of the part with a measuring device to measure a deviation between the previous tool path and an actual part profile using the measuring device over at least substantially the entire circumferential edge of the part;

c) combining the previous tool path with the measured deviation to determine a computed tool path; and d) following the circumferential edge of the part with a treating device using the computed tool path, wherein the computed tool path represents the sum of the previous tool path and the measured deviation, wherein the circumferential edge of the part is measured and treated; and wherein the computed tool path follows the circumferential edge of the part precisely to improve the accuracy of the edge treatment process.

The present invention makes the assumption that even though similar parts to be measured and treated may have a predetermined general shape and aspect ratio, each part is unique. Thus, each part is mapped with the measuring device to generate a unique motion profile for every part. Thereafter, an adjusted (computed) tool path is created for each part for the treating device to follow.

The part typically comprises a rigid or semi-rigid material selected from the group consisting of ceramics, glass, laminates, veneers, composite materials, thermoplastic and/or thermosetting polymers, photosensitive materials or photocurable materials, wood, metal, metal alloys, and combinations of one or more of the foregoing. Other materials having sufficient rigidity and which have a circumferential edge requiring an edge treatment would also be suitable for use in the method described herein.

By "rigid" what is meant is that the material will holds its shape, without flexing or bending during the process. However, the process described herein may also be usable with less-rigid or non-rigid (i.e., flexible materials) if the part is kept in contact with a backing surface that has sufficient rigidity during the processing steps described herein.

FIG. 1 depicts a first view of the measuring device in accordance with one embodiment of the present invention. As seen in FIG. 1, the measuring device 4 comprises a roller 5 that is rotatably mounted within a yoke 6. Alternatively, the measuring device 4 may comprise a similarly dimensioned wheel or non-rotating round surface that contacts substantially the entire circumferential edge of the part to be measured. A non-contacting measuring device such as a laser may also be used in the practice of the invention, if desired.

The roller 4 and yoke 6 are mounted on a four bar linkage comprising a mount 8 and upper arm 12 and lower arm 14 which are coupled to a stationary structure 10. The four bar linkage only allows the roller 4 to move in an arc-shaped motion that is generally vertical. The upper arm 12 also comprises an appendage 12A that rotates with the four bar linkage motion. This appendage 12A is used to deflect a Linear Variable Differential Transformer (LVDT) probe 16, thus providing an electronic measurement signal to the supporting electronics that is proportional to the vertical displacement of the roller 4. The circumferential edge to be measured touches the top side of the measuring device 4 and the deflection is measured through the vertical roller motion coupled to the LVDT probe 16 of the measuring device. The circumferential edge of the part is mapped with the measuring device 4 to measure a deviation between the predicted tool path and an actual surface profile over at least substantially the entire circumferential edge of the part.

It is noted that other movement means that are capable of allowing the measuring device 4 to move vertically would also usable in the practice of the invention. In addition, other types of measuring probes may also be used in the practice of the invention.

The measuring device described and shown in FIG. 1 is optionally, but preferably, used as part of a larger process machinery for treating the circumferential edges of component parts.

The treating step with the treating device may comprise any of a number of treating or finishing steps, including for example, priming, painting, coating, pre-coating, machining, grinding, sanding, polishing, or thermal edge finishing a circumferential edge of the part. In one embodiment, if the treating step involves coating, priming, painting or other similar treating of the part, the coating or painting roller does not contact the part; only the coating material or paint itself contacts the part.

Figure 2:
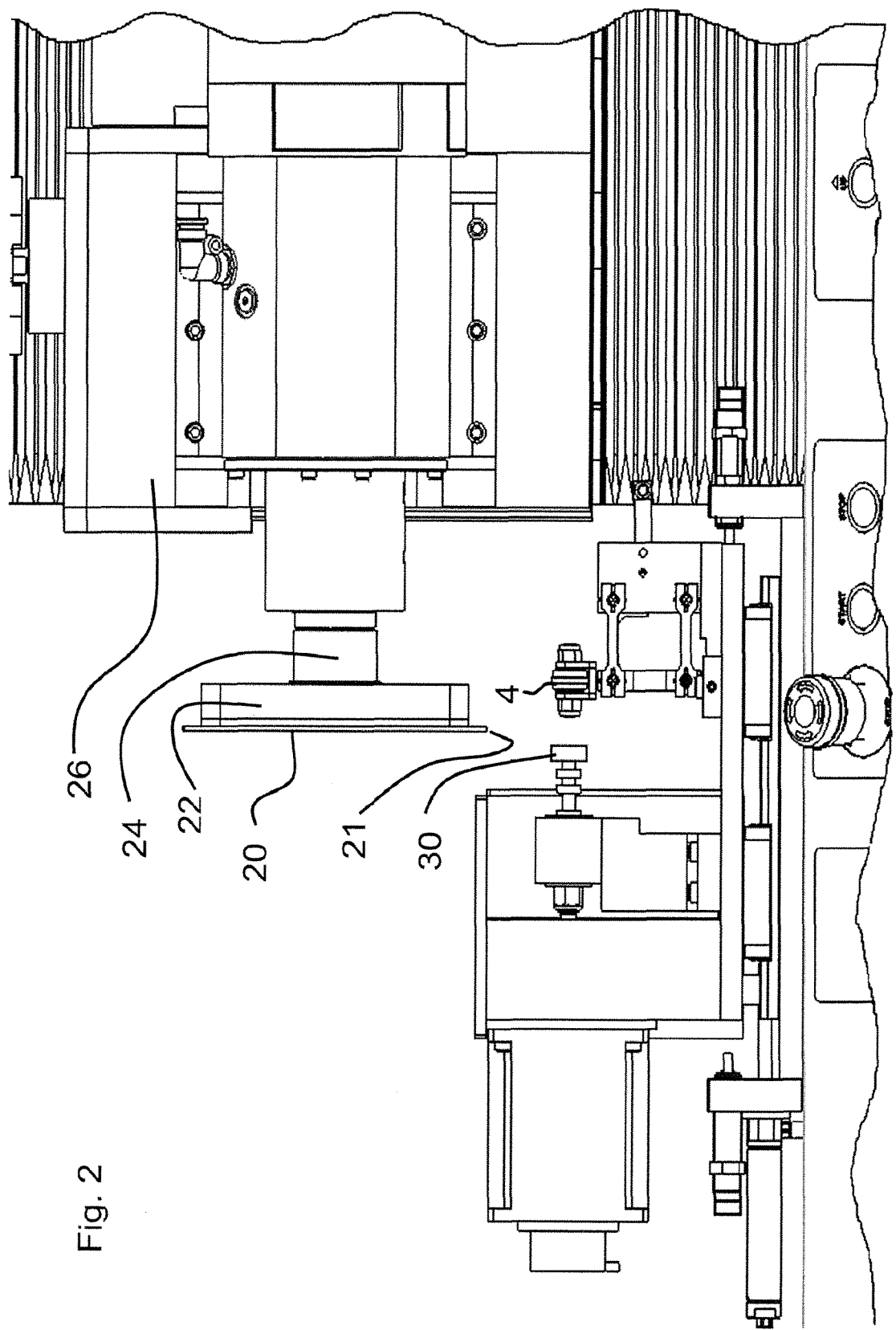
FIG. 2 depicts a view of the measuring and treating apparatus in accordance with the present invention.

As shown in FIG. 2, the treating device 30 comprises a roller or a wheel or a non-rotating round surface. Optionally, but preferably, the treating device roller or wheel has substantially the same diameter as the measuring roller or wheel 4. This greatly simplifies the computational process that must be undertaken by the microprocessor.

The treating device 30 (roller or wheel or non-rotating round surface) may be coated with a liquid material to be applied to the part edge, or may have removal media such as sandpaper for treating the edge by material removal processing, by way of example and not limitation. If the treating step involves the application of a liquid the treatment device 30 is dipped in the liquid at the bottom of the roller and applies the liquid at the top of the roller.

FIGS. 1 and 2 depict the apparatus of the invention in a vertical orientation. For other edge treatment methods, the apparatus orientation can be horizontal. Thus, the method and apparatus described herein are applicable to both vertical and horizontal orientations.

The part 20 to be measured and treated is secured to machine elements that allow for rotational movement of the part, and a carriage 26 that allows for vertical movement. Thus, the part 20 is carried by the machine elements in such a way so as to allow the edge 21 to be presented in its entirety circumferentially to the measuring device 4. For example, the part 20 may be secured to a rotary spindle 24.

The part 20 may be secured to the spindle 24 by various mechanical fixing means 22, including, for example, vacuum, permanent magnets and electromagnets, by way of example and not limitation. What is important is that the part 20 is easily and repeatably secured to and removed from the spindle 24 without damage to the part 20.

The rotating spindle 24 is preferably provided with a closed loop position control over the rotational position of the spindle. In addition, horizontal movement is provided so that the part 20 to be treated may be either measured by the measuring device 4 or treated by the treating device 30. Thus, the spindle is optionally, but preferably mounted to a linear slide 26 which also has a closed loop position control over the slide position along its path of travel.

Figure 3:
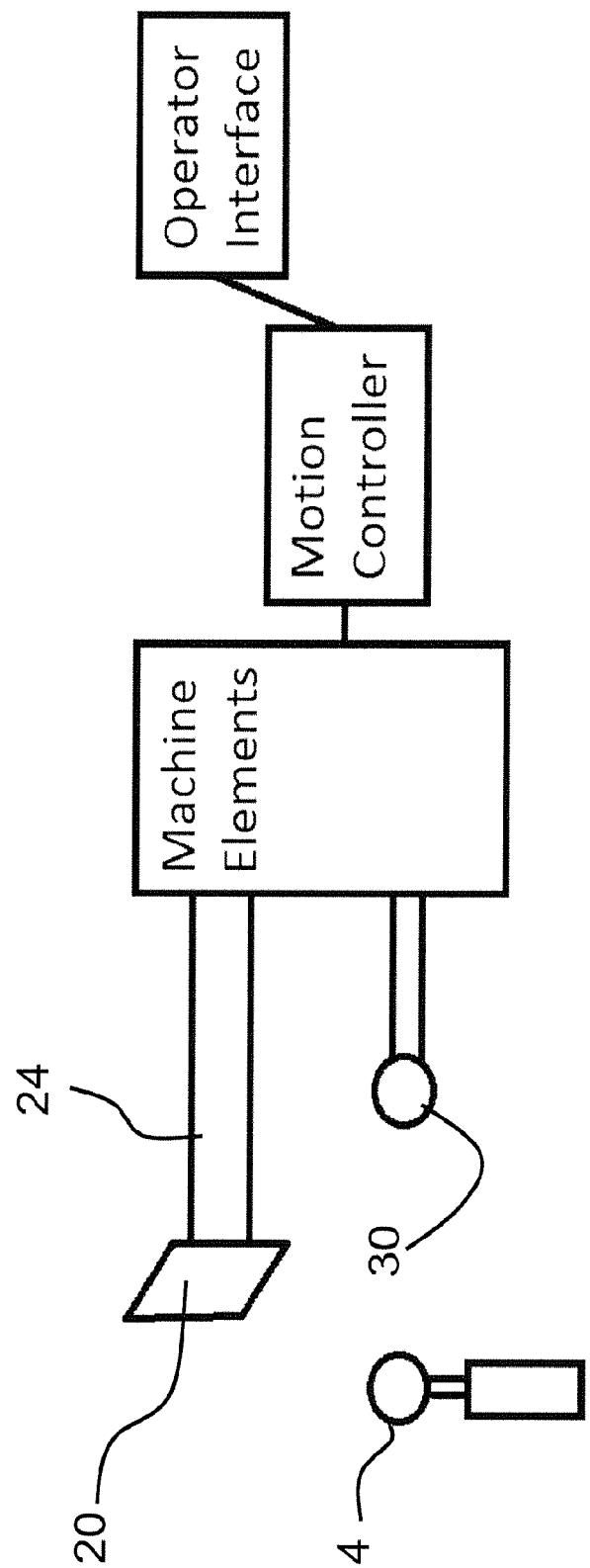
FIG. 3 depicts the control hierarchy for the various elements of the apparatus.

As shown in FIG. 3, the machine elements are controlled by a motion controller which monitors the positions of the machine elements and is capable of commanding axis positions in simultaneously coordinated motion profiles (sometimes referred to as CNC or computer numerical control). This motion controller generates the predicted tool path or motion profile used to measure or treat the work piece.

Overseeing the motion controller is an operator interface computer. This computer allows the part dimensions to be entered and saved for later retrieval. This computer also serves as the operator or human interface with the machine. When part dimensions or process conditions are changed, the operator interface computer sends the updated information to the motion controller.

Referring again to FIG. 2, during either the measuring step or the treating step, the part 20 is moved by the machine elements so that the entire circumferential edge of the surface 20 may be measured or treated. Additionally the components may be moved vertically and horizontally so that the surface 20 may be moved or shifted between the measuring device 4 and the treating device 30. The part 20 mounted on the machine elements moves relative to the measuring device 4 or the treating device 30 so that the edge 21 remains in contact with the measuring device 4 or the treating device 30 while the part 20 is being measured or treated.

Thus, the part 20 rotates relative to the measuring device 4, and as the part 20 rotates, the part also moves up and down, ideally such that the measuring device senses no motion, indicating the travel path of the part has been generated so that it exactly matches the surface profile under test. Any deviations measured by the measuring device 4 represent the surface profile error in comparison with the ideal profile. The circumferential edge of the surface to be measured is brought into contact with the measuring device 4 and the circumferential edge of the part is measured by rotating the entire circumferential edge of the surface against the measuring device 4. The measuring device 4 moves linearly relative to the part mounted on the spindle due to the difference between the predicted edge position and actual surface of the circumferential edge.

By collecting the differential measurement between the predicted path and actual surface during the measurement, an error map of the surface deviations can be collected. In addition, the measuring device 4 is provided with sufficient "travel" to accommodate deviations of the edge surface as well as part placement eccentricity errors of the part 20 on the spindle 24.

The motion controller collects the error map of the surface deviations and combines this with the predicted tool path motion commands to create a new computed tool path motion. Thus, the computed tool path represents the sum of the predicted tool path and the measured part profile deviation. This new computed tool path can be used to move the part 20 through space more accurately while the part is undergoing the treatment step.

As described herein, after the circumferential edge of the part is mapped with the measuring device to measure a deviation between the predicted tool path and an actual part profile using the measuring device, the predicted tool path is combined with the measured deviation to determine a computed tool path for the treating device. By using the computed tool path during the treatment process, the edge treatment of the part is performed more accurately.

Figure 4:
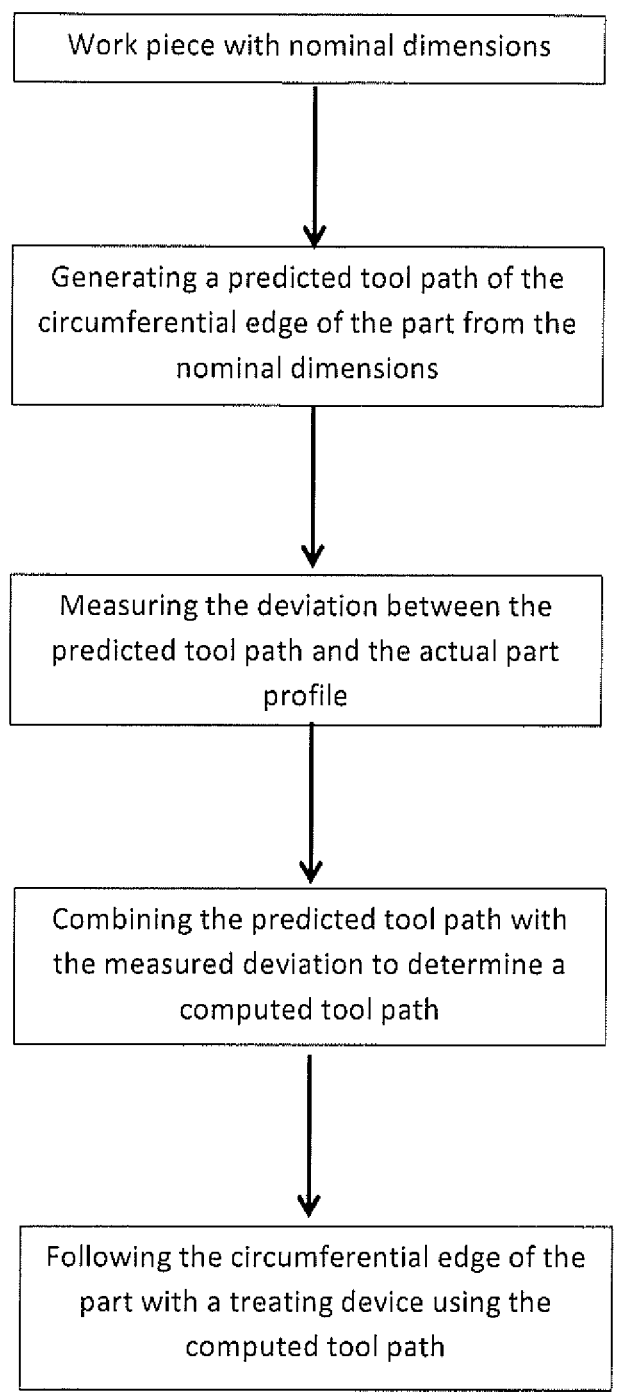
FIG. 4 depicts a flowchart showing the process steps in accordance with one aspect of the present invention.
Figure 5:
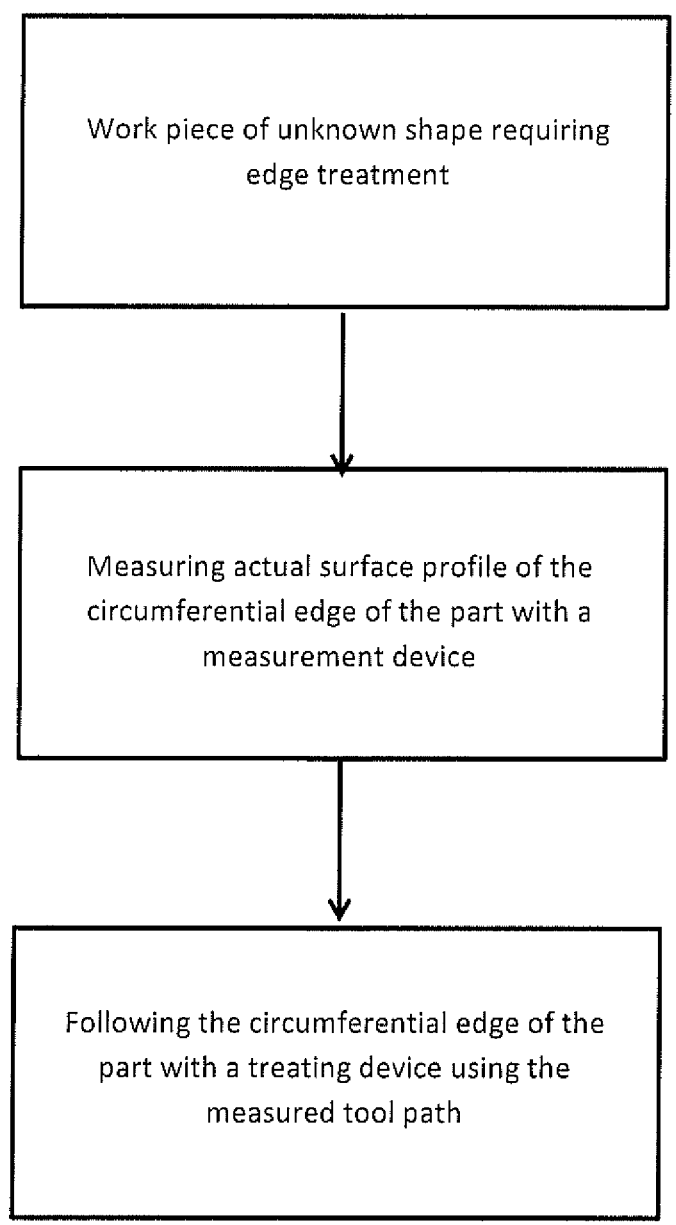
FIG. 5 depicts a flowchart showing the process steps in accordance with another aspect of the present invention.
Figure 6:
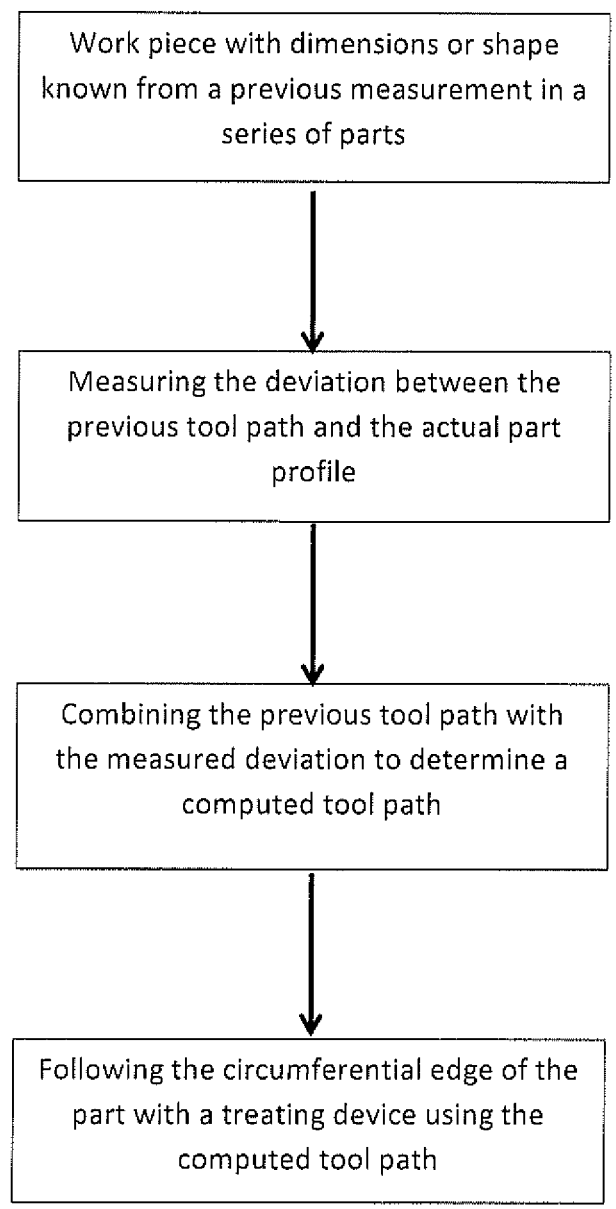
FIG. 6 depicts a flowchart showing the process steps in accordance with another aspect of the present invention.

As described and shown in FIG. 2, the process machinery described herein may be used in multiple ways. FIGS. 4, 5, and 6 depict flowcharts showing the process steps in accordance with various aspects of the present invention.

For example, the process machinery described herein may be used to process a part having an unknown shape and unknown dimensions in which:
  (1) the circumferential edge of the surface of the part is mapped with a measuring device to measure the surface profile and simultaneously create a computed tool path for the actual surface profile; and
  (2) the circumferential edge of the surface of the part is followed with a treating device using the computed tool path;
wherein the tool path follows the circumferential edge of the surface of the part precisely, thus improving the accuracy of the edge treatment process.

In the alternative, the process machinery described herein may also be used to process a part having a predetermined general shape and aspect ratio in which:
  (1) a predicted tool path of the circumferential edge of the part is generated based on the predetermined general shape and aspect ratio of the part;
  (2) the circumferential edge of the part is mapped with a measuring device to measure a deviation between the predicted tool path and an actual part profile using the measuring device over at least substantially the entire circumferential edge of the part;
  (3) the predicted tool path is combined with the measured deviation to deter mine a computed tool path; and
  (4) the circumferential edge of the part is followed with a treating device using the computed tool path.
wherein the tool path follows the circumferential edge of the surface of the part precisely, thus improving the accuracy of the edge treatment process.

The present invention also relates generally to an apparatus for measuring and treating a circumferential edge of a part, the apparatus comprising:
  a) a measuring device for mapping and measuring the circumferential edge of the part, wherein the measuring device is capable of measuring a deviation between a predicted tool path and an actual surface profile over at least substantially the entire circumferential edge of the part;
  b) a treating device for processing the circumferential edge of the part after the circumferential edge of the part has been mapped and measured;
  c) machine elements capable of securing the part and moving the circumferential edge of the part relative to the measuring device or the treating device;
  d) a motion controller for monitoring and controlling the machine elements, wherein the motion control electronics store information related to the predicted tool path of the part and are capable of calculating the actual surface profile of at least substantially the entire circumferential edge of the part, and wherein the motion control electronics command the machine elements to move the circumferential edge of the part relative to the measuring device or the treating device to measure and/or treat the circumferential edge of the part, and
  e) an operator interface computer operatively connected to the motion controller, wherein the operator interface computer provides operator control over the machine elements.

The tool path motion profile is used by the motion controller to command the machine elements carrying the work piece. The work piece is thusly moved in space so as to present the circumference of the part edges to the measuring device. The measuring device is sampled simultaneously during the motion program, creating an error map of the circumference of the part edge. The circumferential edge of the part is treated by the treatment device using a second (computed) tool path motion profile. Thus, the treatment of the circumferential edge of the part is performed precisely due to the measurement of the actual part dimensions.

The part 20 is measured to a high level of precision to generate a unique motion profile. The generated motion profile is thereafter used in the treating step to treat the part edge 21.

As described herein, the present invention uses a macro-profile based on the predetermined general shape and aspect ratio of the part to generate a predicted tool path. Thereafter, the part is mapped with a more precise profile using the measuring device, following the outline of the part with the measuring device 4 to determine the difference between the predicted tool path and the actual surface profile. The predicted tool path is then combined with the data from the measuring device 4 to obtain a measured deviation and calculate a computed tool path for the subsequent treating step. The tool path is then repeated with the more precise profile in the treating step using the computed tool path.

The present invention allows for real-time part measuring and treating in a precise manner.

The operator interface computer may be pre-populated with size and aspect ratios of commonly used parts. The operator interface computer may also include an input screen for the user to input information regarding the part, including length and width of the part as well as the aspect ratio of the part and/or general shape and/or any other attributes.

Spatially orienting terms such as "up", "down", "upper", "vertical", "horizontal", and the like, where used herein, refer to the positions of the respective elements shown on the accompanying drawing figures and the present invention is not necessarily limited to such positions.

As can be seen from the foregoing as well as the figures, the present invention provides for improvements over the prior art in that the present invention provides an improved means of measuring a circumferential edge of a part in an unique manner that overcomes the deficiencies of the prior art.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. A method of treating a circumferential edge of a part having a predetermined general shape and aspect ratio, the method comprising the steps of:
   a) generating a predicted tool path of the circumferential edge of the part based on the predetermined general shape and aspect ratio of the part;
   b) mapping the circumferential edge of the part with a measuring device to measure a deviation between the predicted tool path and an actual part profile using the measuring device over the circumferential edge of the part;
   c) combining the predicted tool path with the measured deviation to determine a computed tool path;
   d) following the circumferential edge of the part with a treating device using the computed tool path, wherein the computed tool path represent the sum of the predicted tool path and the measured surface profile deviation,
      wherein the circumferential edge of the part is measured and treated, and
      wherein the computed tool path follows the circumferential edge of the part precisely to improve the accuracy of the edge treatment process.

2. The method according to claim 1, wherein the part comprises a material selected from the group consisting of ceramics, glass, laminates, veneers, composite materials, thermoplastic and/or thermosetting polymers, photosensitive materials or photocurable materials, wood, metal, metal alloys, and combinations of one or more of the foregoing.

3. The method according to claim 1, wherein the measuring device comprises a roller or a wheel or a non-rotating round surface.

4. The method according to claim 3, wherein the treating device comprises a roller or a wheel or a non-rotating round surface and the treating device has substantially the same diameter as the measuring device.

5. The method according to claim 1, wherein the treating step with the treating device comprises priming, painting, coating, pre-coating, machining, grinding, sanding, polishing, or thermal edge finishing the circumferential edge of the part.

6. The method according to claim 1, comprising the step of mounting the part on machine elements, whereby the part can be quickly and repeatably exchanged on the machine elements.

7. The method according to claim 6, wherein the machine elements are capable of vertical and rotational movement, wherein the part mounted on the machine elements rotates relative to the measuring device and the part remains in contact with the measuring device while the part is being measured;
   wherein the computed tool path is obtained.

8. The method according to claim 7, wherein measuring device moves linearly relative to the part mounted on the machine elements due to the difference between a predicted measurement position and an actual measurement position of the circumferential edge obtained by the measuring device.

9. A method of treating a circumferential edge of a part having an unknown shape and dimensions, the method comprising the steps of:
   a) mapping the circumferential edge of the part having the unknown shape and dimensions with a measuring device, wherein the measuring device comprises a roller or a wheel or a non-rotating round surface and a circumferential edge of the roller or the wheel or the non-rotating round surface contacts the circumferential edge of the part to measure the actual surface profile of the part and create the tool path for a separately mounted treating device to follow; and
   b) following the circumferential edge of the part with the separately mounted treating device using the tool path computed by the measuring device, wherein the treating device comprises a roller or a wheel or a non-rotating round surface that is the same size as the measuring device,
      wherein the circumferential edge of the part is measured and treated, and
      wherein the tool path follows the circumferential edge of the part precisely to improve the accuracy of the edge treatment process.

10. A method of treating a series of circumferential edges of parts having similar shapes and dimensions, comprising the steps of:
   a. obtaining a previous tool path of the circumferential edge of a part, wherein the previous tool path is one used in treating a previous work piece having a similar shape and dimensions;
   b. mapping the circumferential edge of a part with a measuring device to measure a deviation between the previous tool path and the actual surface profile using the measuring device over the circumferential edge of the part;
   c. combining the previous tool path with the measured deviation to determine a computed tool path; and
   d. following the circumferential edge of the part with a treating device using the computed tool path, wherein the computed tool path represents the sum of the previous tool path and the measured deviation,
      wherein the circumferential edge of the part is measured and treated, and
      wherein the computed tool path follows the circumferential edge of the part precisely to improve the accuracy of the edge treatment process.

11. An apparatus for measuring and treating a circumferential edge of a part, the apparatus comprising:
   a) a measuring device capable of creating a computed tool path for treating the circumferential edge of the part by mapping and measuring the circumferential edge of the part, wherein the measuring device comprises a roller or a wheel or a non-rotating round surface that is capable of contacting the circumferential edge of the part, wherein the measuring device is mounted in a yoke that only allows the measuring device to move linearly relative to the part, and wherein the measuring device is capable of measuring a deviation between a predicted tool path and an actual surface profile over the circumferential edge of the part;
   b) a treating device separately mounted from the measuring device, wherein the treating device is capable of processing the circumferential edge of the part after the circumferential edge of the part has been mapped and measured by the measuring device;

c) machine elements capable of securing the part and moving the entire circumferential edge of the part relative to the measuring device and moving the entire circumferential edge of the part relative to the separately mounted treating device;

d) a motion controller for monitoring and controlling the machine elements, wherein the motion control electronics store information related to the predicted tool path of the part and the measured tool path and are capable of calculating the actual surface profile of the circumferential edge of the part to determine the computed tool path, and wherein the motion control electronics command the machine elements to move the circumferential edge of the part relative to the measuring device to measure the circumferential edge of the part and to move the circumferential edge of the part relative to the treating device to treat the circumferential edge of the part using the computed tool path, and e) an operator interface computer operatively connected to the motion controller, wherein the operator interface computer provides operator control over the machine elements.

12. The apparatus according to claim 11, wherein the treating device comprises a roller or a wheel or a non-rotating round surface and the treating device surface has substantially the same diameter as the measuring device.

13. The apparatus according to claim 11, wherein the machine elements are capable of vertical and rotational movement, wherein the part rotates relative to the measuring device.

14. The apparatus according to claim 11, wherein the machine elements comprise a rotary spindle mounted on a carriage and coupled to at least one linear slide.

15. The apparatus according to claim 11, wherein the part remains in contact with the measuring device while the part is being measured;

wherein the computed tool path is obtained.

16. The apparatus according to claim 11, wherein measuring device moves linearly relative to the part mounted on the machine elements due to the difference between the predicted measurement position and actual measurement position of the circumferential edge.

* * * * *